United States Patent
Lee et al.

(10) Patent No.: US 8,018,654 B2
(45) Date of Patent: Sep. 13, 2011

(54) OPTICAL SHEET, METHOD FOR MANUFACTURING THE SAME, AND LIQUID CRYSTAL DISPLAY USING THE SAME

(75) Inventors: Chunghyuk Lee, Cheongju (KR); Seungho Lee, Cheongju (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 12/173,088

(22) Filed: Jul. 15, 2008

(65) Prior Publication Data

US 2009/0135501 A1    May 28, 2009

(30) Foreign Application Priority Data

Nov. 23, 2007  (KR) .................. 10-2007-0120039

(51) Int. Cl.
*G02B 27/10* (2006.01)
(52) U.S. Cl. .................................. 359/619
(58) Field of Classification Search .......... 359/619, 359/707–708, 717; 349/64–68
See application file for complete search history.

(56) References Cited

U.S. PATENT DOCUMENTS

| | | | |
|---|---|---|---|
| 6,577,358 B1 | 6/2003 | Arakawa et al. | |
| 6,628,460 B1 * | 9/2003 | Ookawa et al. | 359/455 |
| 6,811,841 B1 * | 11/2004 | Castiglione et al. | 428/34 |
| 2002/0012082 A1 * | 1/2002 | Goto et al. | 349/86 |
| 2003/0017281 A1 | 1/2003 | Mizutani et al. | |
| 2004/0061944 A1 | 4/2004 | Kashima et al. | |
| 2004/0257651 A1 * | 12/2004 | Hirata et al. | 359/456 |
| 2006/0228559 A1 | 10/2006 | Denker et al. | |
| 2006/0291065 A1 * | 12/2006 | Hasei et al. | 359/619 |
| 2007/0092730 A1 * | 4/2007 | Inakura et al. | 428/411.1 |
| 2007/0121227 A1 * | 5/2007 | Wang et al. | 359/831 |
| 2007/0177386 A1 | 8/2007 | Masaki et al. | |
| 2008/0231976 A1 * | 9/2008 | Commander et al. | 359/833 |

FOREIGN PATENT DOCUMENTS

| | | |
|---|---|---|
| EP | 1178075 A1 | 2/2002 |
| JP | 11-23815 A | 1/1999 |
| JP | 2000-206318 A | 7/2000 |
| JP | 2001-220432 A | 8/2001 |
| JP | 2002-67057 A | 3/2002 |
| JP | 2006-110988 A | 4/2006 |
| KR | 10-2004-0079028 A | 9/2004 |
| KR | 10-2007-0020614 A | 2/2007 |
| WO | WO-2006/026743 A1 | 3/2006 |
| WO | WO-2007-037649 A1 | 4/2007 |

* cited by examiner

*Primary Examiner* — Ricky L Mack
*Assistant Examiner* — Vipin M Patel
(74) *Attorney, Agent, or Firm* — Birch, Stewart, Kolasch & Birch, LLP

(57) ABSTRACT

An optical sheet comprises: a base film; a first primer layer disposed on a surface of the base film; and a projection disposed on the first primer layer, wherein a thickness of the first primer layer ranges from about 5 nm to 300 nm.

20 Claims, 8 Drawing Sheets

OPTICAL SHEET, METHOD FOR MANUFACTURING THE SAME, AND LIQUID CRYSTAL DISPLAY USING THE SAME

This nonprovisional application claims priority under 35 U.S.C. §119(a) on Patent Application No. 10-2007-0120039 filed in Republic of Korea on Nov. 23, 2007, the entire contents of which are hereby incorporated by reference.

BACKGROUND OF THE DISCLOSURE

1. Field of the Disclosure

This document relates to an optical sheet, a method for manufacturing the same, and a liquid crystal display using the same.

2. Description of the Background Art

As the information technology is being developed, the market of display devices, connection mediums between users and information, is growing. In line with this, flat panel displays (FPD), such as a liquid crystal display (LCD), organic light emitting diode (OLED), and a plasma display panel (PDP), are increasingly used. Among the various types of flat panel displays, the LCD, which can implement high resolution and can be fabricated to be small or large in its screen size, is commonly employed.

Here, the LCD is classified as a light-receiving type display device. It can display images upon receiving light from a backlight unit disposed at a lower side of a liquid crystal panel.

In order to effectively provide light to the liquid crystal panel, the backlight unit may comprise a light source, an optical film layer, and the like. Here, the optical film layer may comprise a diffusion sheet, an optical sheet, a protection sheet, and the like.

Optical characteristics of the plurality of sheet layers formed as the optical film may drastically change depending on conditions how they are provided or depending on their structural conditions, etc. The change in the optical characteristics of the optical film layer affects light efficiency of the backlight unit and further the display quality of the LCD.

Thus, in order to improve the display quality of the LCD, the research on the field related to the optical film layer needs to be continued.

SUMMARY OF THE DISCLOSURE

An aspect of this document is to provide an optical sheet, a method for manufacturing the same, and a liquid crystal display using the same.

In one aspect, an optical sheet comprises: a base film; a first primer layer disposed on a surface of the base film; and a projection disposed on the first primer layer, wherein a thickness of the first primer layer ranges from about 5 nm to 300 nm.

In another aspect, a liquid crystal display comprises: a liquid crystal panel; a light source; and optical sheet including: a base film, a first primer layer disposed on a surface of the base film, a projection disposed on the first primer layer, wherein a thickness of the first primer layer ranges from about 5 nm to 300 nm.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION OF EMBODIMENTS

Reference will now be made in detail embodiments of the invention examples of which are illustrated in the accompanying drawings.

The detailed exemplary embodiments of the present invention will now be described with reference to the accompanying drawings.

Figure 1:
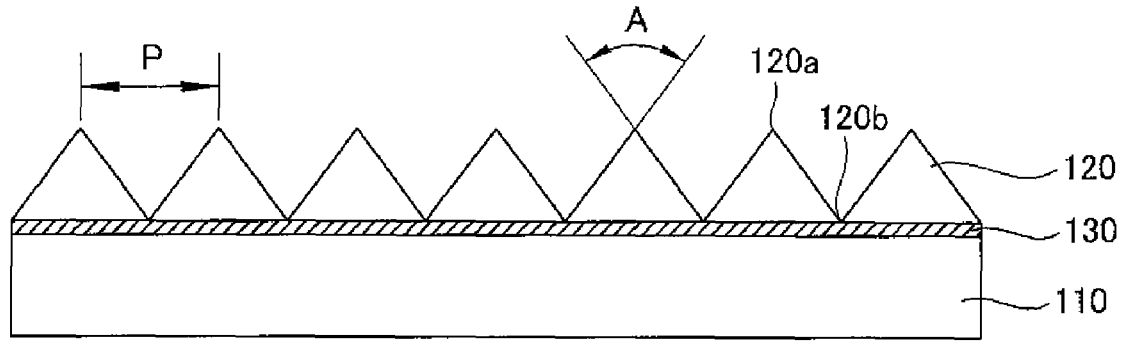
FIG. 1 is a sectional view of an optical sheet according to a first exemplary embodiment of the present invention.
Figure 2:
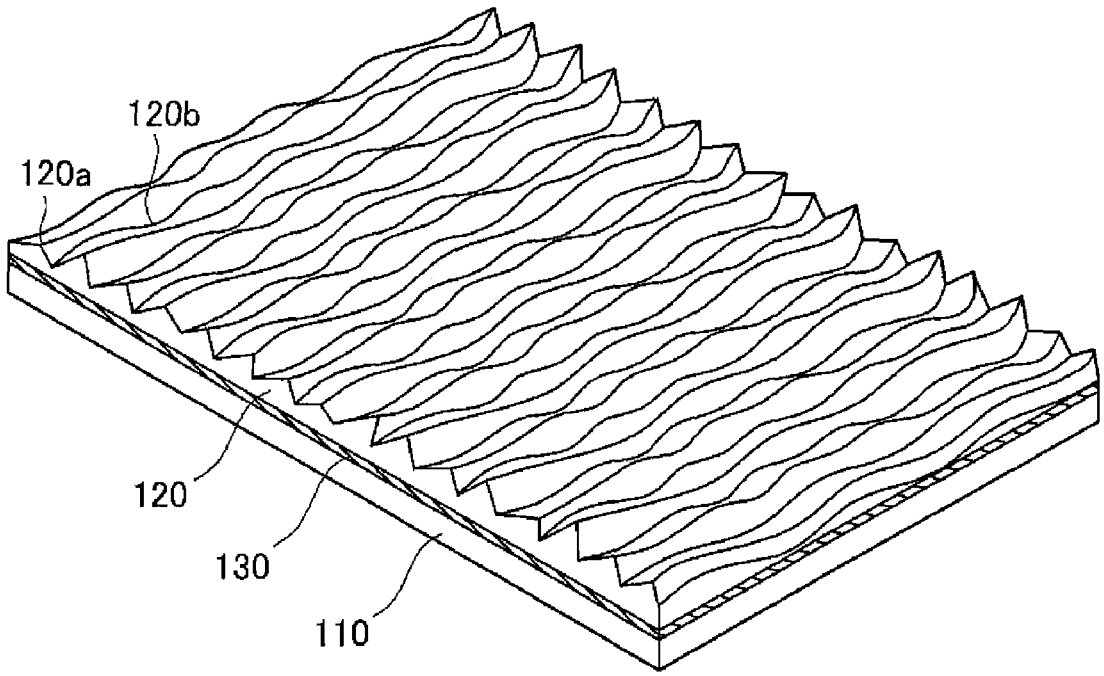
FIG. 2 is a perspective view of the optical sheet in FIG. 1.

As shown in FIGS. 1 and 2, an optical sheet according to a first exemplary embodiment of the present invention may comprise a base film 110. In addition, the optical sheet may comprise a projection 120 outwardly projected from the base film 110. The optical sheet may further comprise a first primer layer 130 disposed between the base film 110 and the projection 120.

The base film 110 may be transparent to allow light inputted from a lower side to be transmitted through. Thus, the base film 110 may be made of a transparent material.

The base film 110 may be made of one selected from the group consisting of polyethylene terephthalate, polycarbonate, polypropylene, polyethylene, polystyrene, and polyepoxy.

The base film 110 may have a certain thickness, e.g., a thickness of about 10 μm to 1,000 μm. With the thickness of 10 μm or greater, the base film 110 may be formed to be thin within the limitation of securing mechanical strength and thermal resistance of the sheet. With the thickness of 1,000 μm or smaller, the base film 110 may secure a mechanical strength and thermal resistance at the maximum level within the limitation of securing flexibility of the sheet. Also, with such a thickness range, the base film 110 may have such properties that it can be easily bent like a film as well as exerting good performance in terms of processibility.

The first primer layer 130 may be used to improve adhesion, an external appearance, and optoelectronic characteristics, and may be made of acryl, ester, urethane, etc., but not limited thereto. The first primer layer 130 may have a certain thickness, e.g., 5 nm to 300 nm. With the thickness of 5 nm or greater, the first primer layer 130 may effectively attach the base film 110 and the projection 120. When the first primer layer 130 is formed to have the thickness of 300 nm or smaller, a spot or molecule clustering cannot be generated in primer processing.

Table 1 shows the relationship of transmittance and adhesive characteristics based on thicknesses of the primer layer.

TABLE 1

| Thickness of primer layer | Transmittance | Adhesive characteristics |
|---|---|---|
| 1 nm | ○ | X |
| 3 nm | ○X | X |
| 5 nm | ○ | ○ |
| 50 nm | □ | □ |
| 60 nm | □ | □ |
| 100 nm | □ | □ |
| 150 nm | □ | □ |
| 200 nm | ○ | □ |
| 250 nm | □ | □ |
| 300 nm | □ | □ |
| 400 nm | X | □ |
| 500 nm | X | □ |

□: excellent,
○: good,
□: normal,
X: bad

Because the first primer layer 130 is formed to be thinner than other layers, its refractive index and thickness may be minutely adjusted over other layers to improve luminance and color coordinates.

Thus, by adjusting the thickness of the first primer layer 130 in performing primer-processing between the base film 110 and the projection 120, light transmittance can be improved and reflectivity can be lowered.

Unlike an adhesive or a bonding agent that merely performs physical bonding, the first primer layer 130 induces chemical bonding as well as physical bonding to allow the base film 110 and the projection 120 to be intensively attached.

As mentioned above, as the material of the base film 110, a poly-based material may be selected, and as the material of the projection 120, a UV (Ultraviolet) resin-based material may be selected. Here, because the interfaces of the base film 110 and the projection 120 to be attached are so smooth, if a general physical bonding is attempted therebetween, good adhesion can be hardly obtained. Thus, the first primer layer 130 is formed between the base film 110 and the projection 120 to induce the chemical bonding in addition to the physical bonding to thus obtain superior adhesion to the physical bonding, and protect the attached interfaces.

Reaction formula 1 shows a chemical reaction between a resin selected as a material of the projection 120 and urethane selected as a material of the first primer layer 130 according to UV curing, which supports the above description.

[Reaction formula 1]

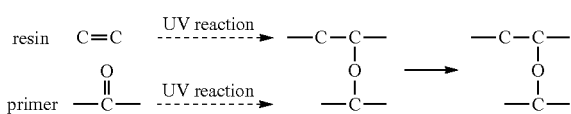

Figure 3:
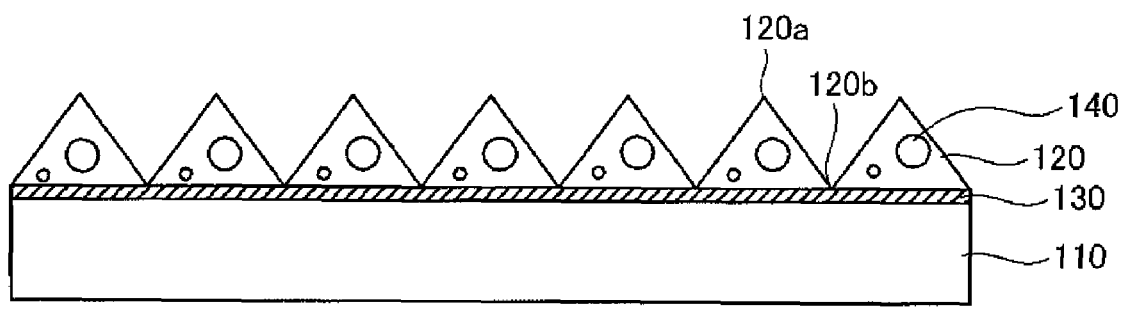
FIG. 3 is a sectional view of an optical sheet according to a first exemplary embodiment of the present invention.

Also, a prism configuration 120 as shown in FIG. 3 may comprise a plurality of beads 140.

Meanwhile, the projection 120 may have a prism configuration as an example in the exemplary embodiment of the present invention. Here, as shown in FIGS. 1 to 3, the prism has a plurality of peaks 120a and a plurality of valleys 120b. The prism configuration may have such a vertically and/or horizontally vibrated pattern that the distance (P) between peaks 120a and the angle (A) of peaks are different at a certain region.

Here, the distance (P) between peaks 120a may range from about 20 μm to 60 μm, the angle (A) may range from about 70° to 110°, and the thickness may range from about 50 μm to 300 μm, but not limited thereto.

Besides the prism configuration as shown in FIGS. 1 to 3, the projection 120 may also have the configuration to be described hereinafter.

Figure 4:
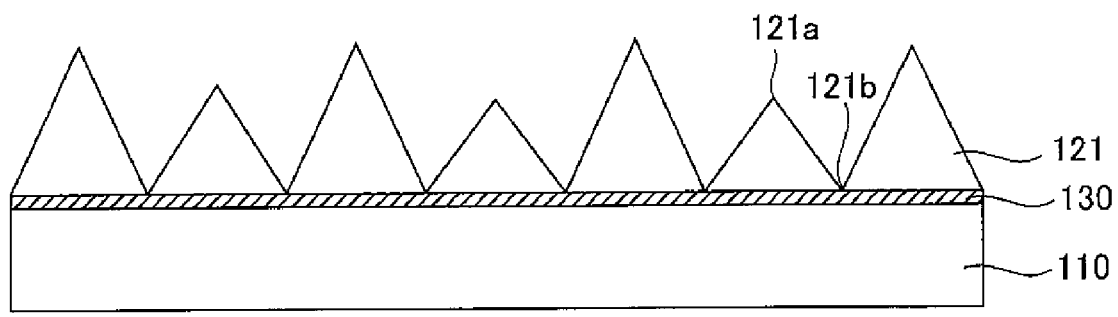
FIGS. 4 to 7 are views showing prism configuration.

A prism configuration 121 as shown in FIG. 4 may be formed such that the distance (P) between peaks 121a and the angle (A) of the peaks 121a are regularly different. The prism configuration 121 may have such diffusion effect that a change in a refraction of light made incident from the exterior is different in a certain region.

Figure 5:
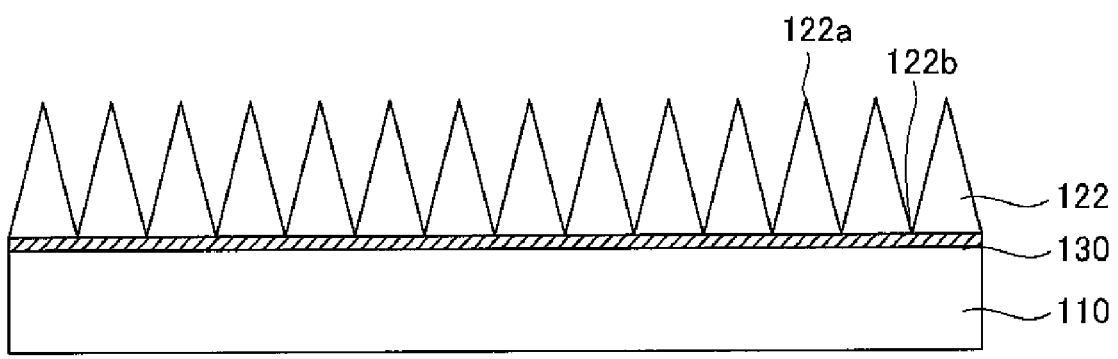

A prism configuration 122 as shown in FIG. 5 may be formed such that the distance (P) between peaks 122a and the angle (A) of peaks 122a are small. Namely, the density of the peaks 122a and valleys 122b is high. The straightness of the light, rather than diffusion effect, can be enhanced.

Figure 6:
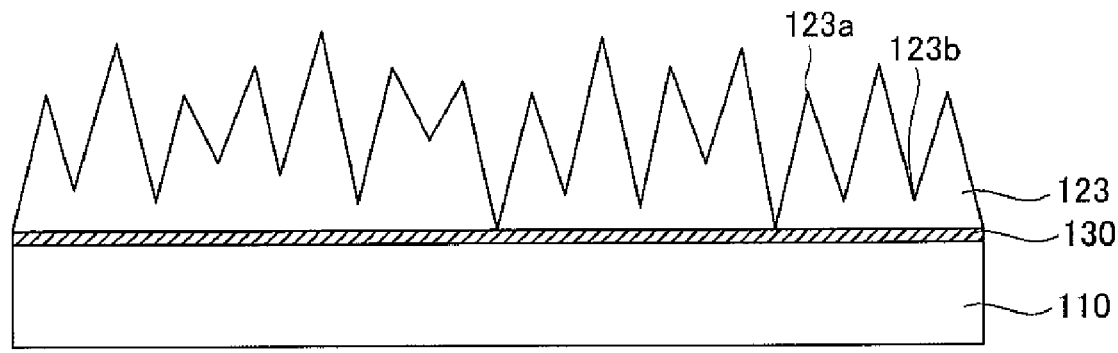

A prism configuration 123 as shown in FIG. 6 may be formed such that the peaks 123a and valleys 123b of the prism configuration are random. This prism configuration 123 can have such a diffusion effect that the angle of refraction of light made incident from the exterior is random.

Figure 7:
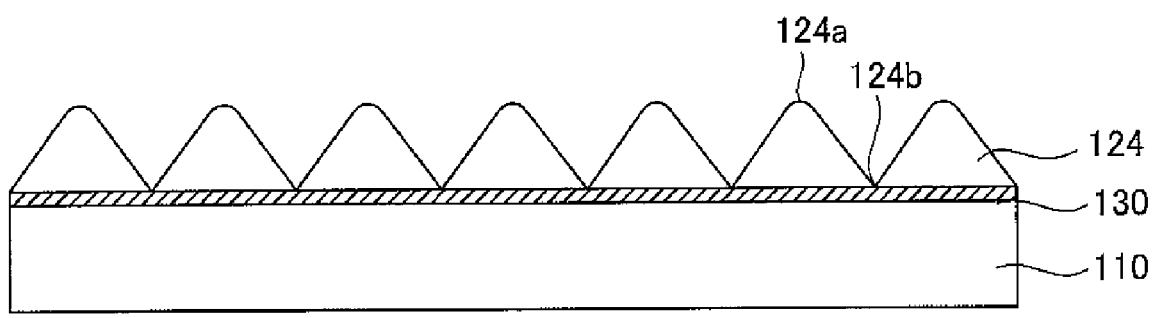

A prism configuration 124 as shown in FIG. 7 may be formed such that the peaks 124a and valleys 124b of the prism configuration are round, the peaks 124a and the valleys 124b are not a straight but a round near peaks 124a. This prism configuration 124 can have such a diffusion effect that the angle of refraction of light made incident from the exterior is wide.

As the projection 120 as described above, a diffusion part having the following shape may be selected.

Figure 8:
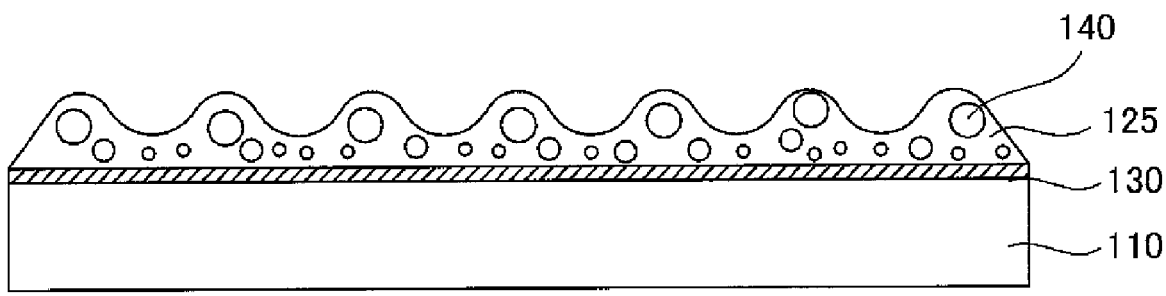
FIG. 8 is a view showing the configuration of a diffusion part.

A diffusion part 125 as shown in FIG. 8 may be formed such that portions where a plurality of beads 140 are positioned are protruded. The diffusion part 125 may have such an effect that light made incident from the exterior can be widely diffused.

Also, as the projection as described above, a micro-lens having the following shape may be selected.

Figure 9:
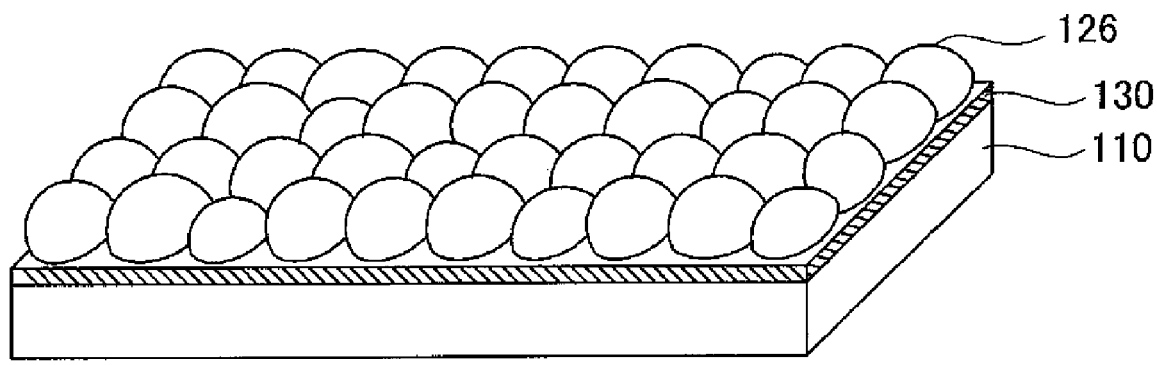
FIG. 9 is a view showing the configuration of a micro-lens.

A micro-lens configuration 126 as shown in FIG. 9 includes a plurality of micro-lenses arranged. Here, a diffusion degree, a refraction degree, condensing a light characteristics, etc., of the micro-lens configuration 126 may vary depending on its pitch, height and density. Accordingly, the lens diameter of the micro-lenses 126 may range from about 20 μm to 200 μm, but not limited thereto. In addition, a distribution degree of the micro-lenses 126 in the entire area may range from about 80% to 90% or greater, but not limited thereto.

As the projection as described above, a lenticular lens having the following configuration may be selected.

Figure 10:
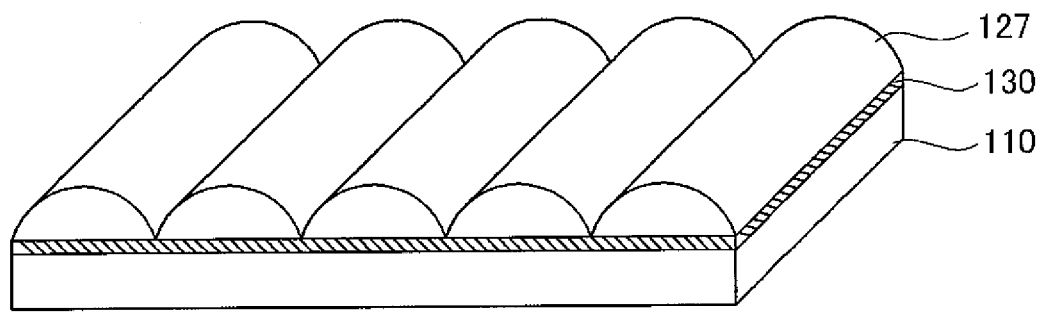
FIG. 10 is a view showing the configuration of a lenticular lens.

The lenticular lens configuration 127 as shown in FIG. 10 may be formed such that hemispherical lenses are arranged to be adjacent. Here, a diffusion degree, a refraction degree, condensing a light characteristics, etc., of the lenticular lens configuration 127 may vary depending on its pitch and density.

Figure 11:
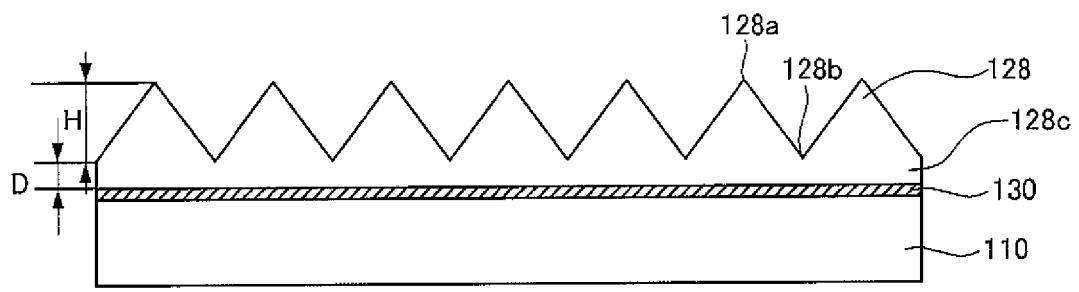
FIGS. 11 and 12 are a sectional view of an optical sheet according to a first exemplary embodiment of the present invention.

The projection as shown in FIG. 11 may comprise a base part 128c. The base part 128c disposed on the first primer layer 130, wherein a thickness D of the base part 128c ranges from about 5%~50% of the height between the peak 128a and valley 128b.

Figure 12:
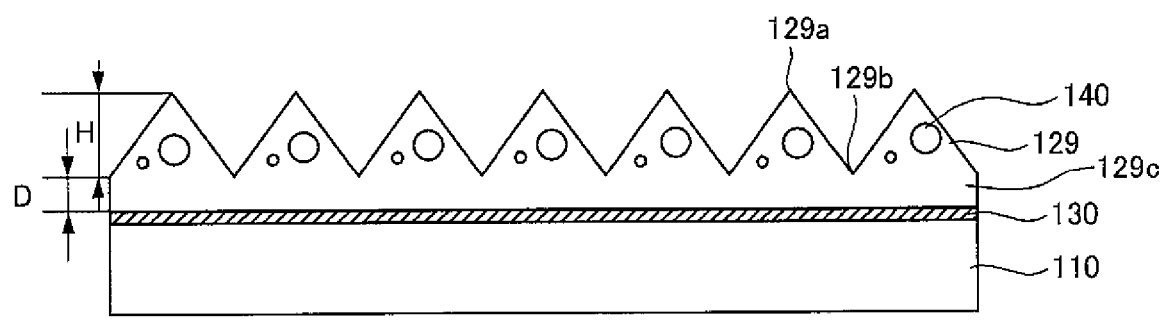
Figure 13:
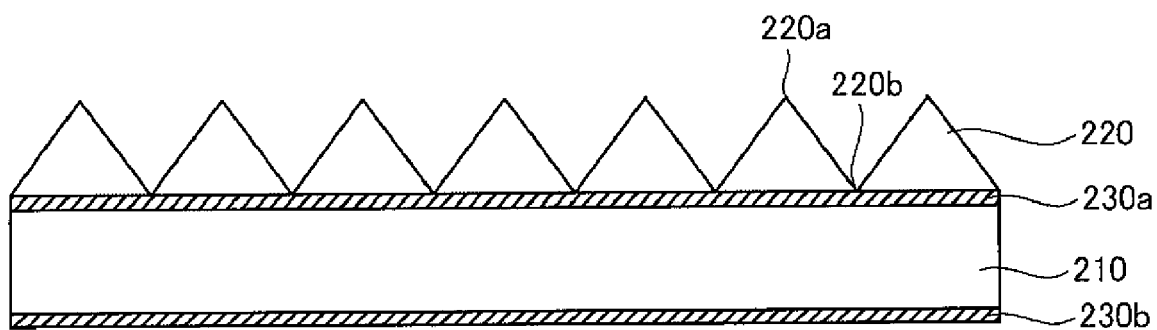
FIGS. 13 to 16 are a sectional view of an optical sheet according to a second exemplary embodiment of the present invention.

The projection as shown in FIG. 12 may comprise a plurality of beads 140 and a base part 129c. The base part 129c disposed on the first primer layer 130, wherein a thickness D of the base part 128c ranges from about 5%~50% of the height between the peak 129a and valley 129b.

As shown in FIG. 13 to FIG. 16, an optical sheet according to a second exemplary embodiment of the present invention may comprise a base film 210. In addition, the optical sheet may comprise a projection 220, 221, 223, 224 disposed on one surface of the base film 210. Also, the optical sheet may comprise a first primer layer 230a positioned between the base film 210 and the projection 220. The optical sheet may comprise a second primer layer 230b disposed on the other surface of the base film 210. A refractive index of the first primer layer 230a and that of the second primer layer 230b may be different.

Here, the base film 210 may be transparent to allow light outputted from a lower side to be transmitted therethrough. Thus, the base film 210 may be made of a transparent material.

The base film 210 may be made of one selected from the group consisting of polyethylene terephthalate, polycarbonate, polypropylene, polyethylene, polystyrene, and polyepoxy.

The base film 210 may have a certain thickness, e.g., a thickness of about 10 μm to 1,000 μm, but not limited thereto. With the thickness of 10 μm or greater, the base film 210 may be formed to be thin within the limitation of securing mechanical strength and thermal resistance of the sheet. With the thickness of 1,000 μm or smaller, the base film 210 may secure a mechanical strength and thermal resistance at the maximum level within the limitation of securing flexibility of the sheet. Also, with such a thickness range, the base film 210 may have such properties that it can be easily bent like a film as well as exerting good performance in terms of processibility.

Figure 14:
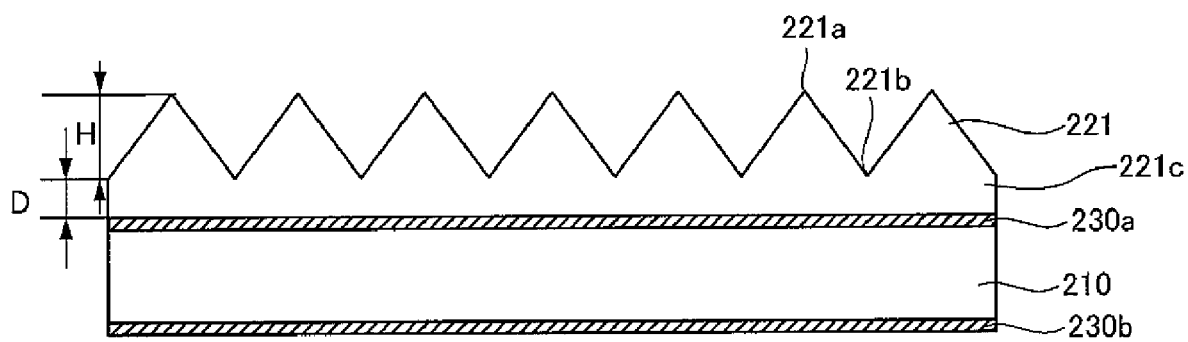

The projection 221 as shown in FIG. 14 may comprise a base part 221c. The base part 221c disposed on the first primer layer 230a, wherein a thickness D of the base part 221c ranges from about 5%~50% of the height between the peak 221a and valley 221b.

Figure 16:
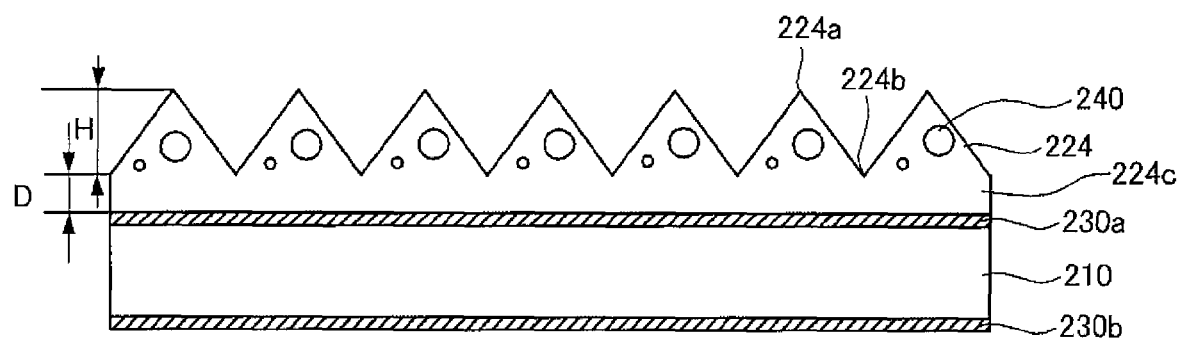

The projection 224 as shown in FIG. 16 may comprise a plurality of beads 240 and a base part 224c. The base part 224c disposed on the first primer layer 230a, wherein a thickness D of the base part 224c ranges from about 5%~50% of the height between the peak 224a and valley 224b.

The first and second primer layers 230a and 230b may be selectively used to improve adhesion, an external appearance, and optoelectronic characteristics, and may be made of acryl, ester, urethane, etc., but not limited thereto.

Because the first and second primer layers 230a and 230b are formed to be thinner than other layers, their refractive index and thickness may be finely adjusted over other layers to improve luminance and color coordinates.

Thus, by adjusting the thickness of the first and second primer layers 230a and 230b in performing primer-processing between the base film 210 and the projection 220, 221, 223, 224, light transmittance can be improved and reflectivity can be lowered.

The thickness of the first primer layer 230a may range substantially from about 5 nm to 300 nm, and that of the second primer layer 230b may range substantially from about 5 nm to 300 nm, but not limited thereto. In this case, it is advantageous that the second primer layer 230b is thicker than the first primer layer 230a.

With the thickness of 5 nm or greater, the first primer layer 230a can effectively attach the base film 210 and the projection 220, 221, 223, 224. When the first primer layer 230a is formed to have the thickness of 300 nm or smaller, a spot or molecule clustering cannot be generated in primer processing.

With the thickness of 5 nm or greater, the second primer layer 230b may protect the other surface of the base film 210 (i.e., prevent the base film from being scratched) and improve the external appearance characteristics. With the thickness 300 nm or smaller, the second primer layer 230b may maintain a range in which light transmittance is optimized.

The thickness of the first and second primer layers 230a and 230b may be calculated according to refractive index, and in order to optimize the light transmittance, the thickness between the two layers may be maintained with a certain distance.

In the optical sheet having such a structure, the reflective index of the base film 210 may be higher than that of the second primer layer 230b. This is to enhance straightness of light made incident from the exterior by reducing the refractive index of the second primer layer 230b that directly contacts with the air. Namely, the first primer layer 230a aims to improve the adhesion characteristics between the base film 210 and the projection 220, while the second primer layer 230b aims to enhance straightness of light made incident to the base film 210 through the second primer layer 230b.

For this purpose, the base film 210 and the second primer layer 230b may be formed such that the difference between their refractive indexes is maintained within the range of about 0.05 to 0.3. For example, the refractive index of the base film 210 may range from about 1.55 to 1.7 while that of the second primer layer 230b may range from about 1.4 to 1.6, but not limited thereto.

In addition, in order to improve an output of light made incident from the exterior and also improve straightness of light, the base film 210, the projection 220, and the first and second primer layers 230a and 230b may be formed such that one or more of their refractive indexes are the same or different. Here, refractive index of the projection 220, 221, 223, 224 may range from about 1.45 to 1.6 and that of the first primer layer 230b may range from about 1.5 to 1.7, but not limited thereto.

Thus, it is advantageous that the surface of the optical sheet, which directly contacts with the air and primarily receives light from the exterior, has a lower refractive index and the surface of the optical sheet, which converts the primarily received light and outputs the same secondarily, has a higher refractive index.

The projection 220, 221, 223, 224 according to the second exemplary embodiment of the present invention has a similar configuration to that in the first exemplary embodiment of the present invention, except that the primer layer is divided into the first and second primer layers 230a and 230b, and the refractive index of the second primer layer 230b is lower than that of the base film 210.

In order to avoid a repetitive description, the second exemplary embodiment of the present invention presents merely the projection 220, 221, 223, 224 having the prism configuration as shown in FIGS. 13 to 16, but the projection 220, 221, 223, 224 may have any configuration of the diffusion part, the micro-lens, the lenticular lens as described in the first exemplary embodiment of the present invention.

Figure 15:
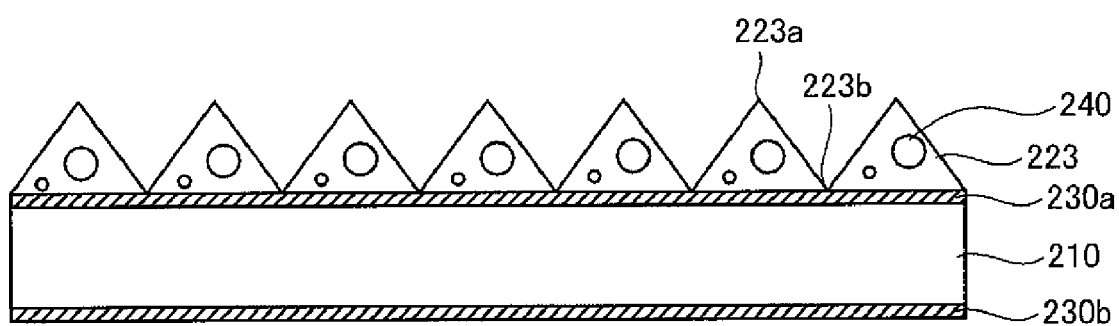

The projection 223, 224 as shown in FIGS. 15 and 16 may comprise beads 240 to increase light efficiency or diffuse light at various angles. The beads 240 may be made of a resin-based material, but not limited thereto.

Figure 17:
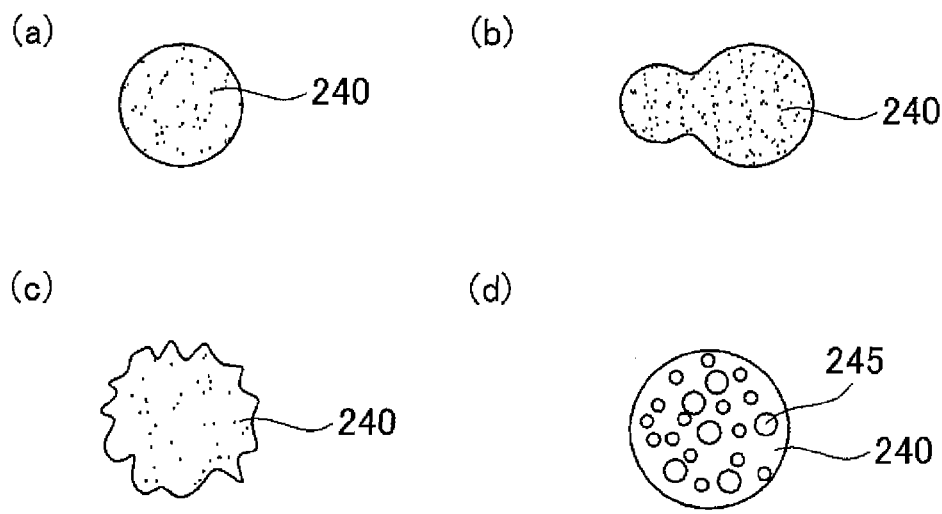
FIG. 17 is a view showing various configurations of beads.

With reference to FIG. 17 (a), a bead may have a ball shape. Such bead 240 may have an effect that it refracts light made incident from the exterior twice therein and reflect one time.

With reference to FIG. 17 (b), a bead 240 may have a snowman shape or a closed-curve shape with two connected balls. Such bead 240 may have an effect that one side thereof allows light made incident from the exterior to be transmitted therethrough and the other side thereof allows light made incident from the exterior to be diffused.

With reference to FIG. 17 (c), a bead 240 has a random shape. Such bead 240 may have an effect that it allows light made incident from the exterior to be refracted and reflected therein at various angles, and also have an effect of a scattered reflection.

With reference to FIG. 17 (d), a bead 240 may comprise smaller beads 245 therein. Such bead 240 may have an effect that it allows light made incident from the exterior to be refracted and reflected therein at various angles, and also have an effect of a scattered reflection. Meanwhile, unlike such bead as shown in FIG. 17 (d), the smaller beads 245 included in the bead 240 may be partially exposed. In addition, the interior of the bead 240 may be divided into upper and lower portions and the smaller beads 245 may be formed within the bead 240 such that the smaller beads 245 have different specific gravities.

A liquid crystal display (LCD) using the optical sheet as described above can be provided in still another aspect of the present invention.

Figure 18:
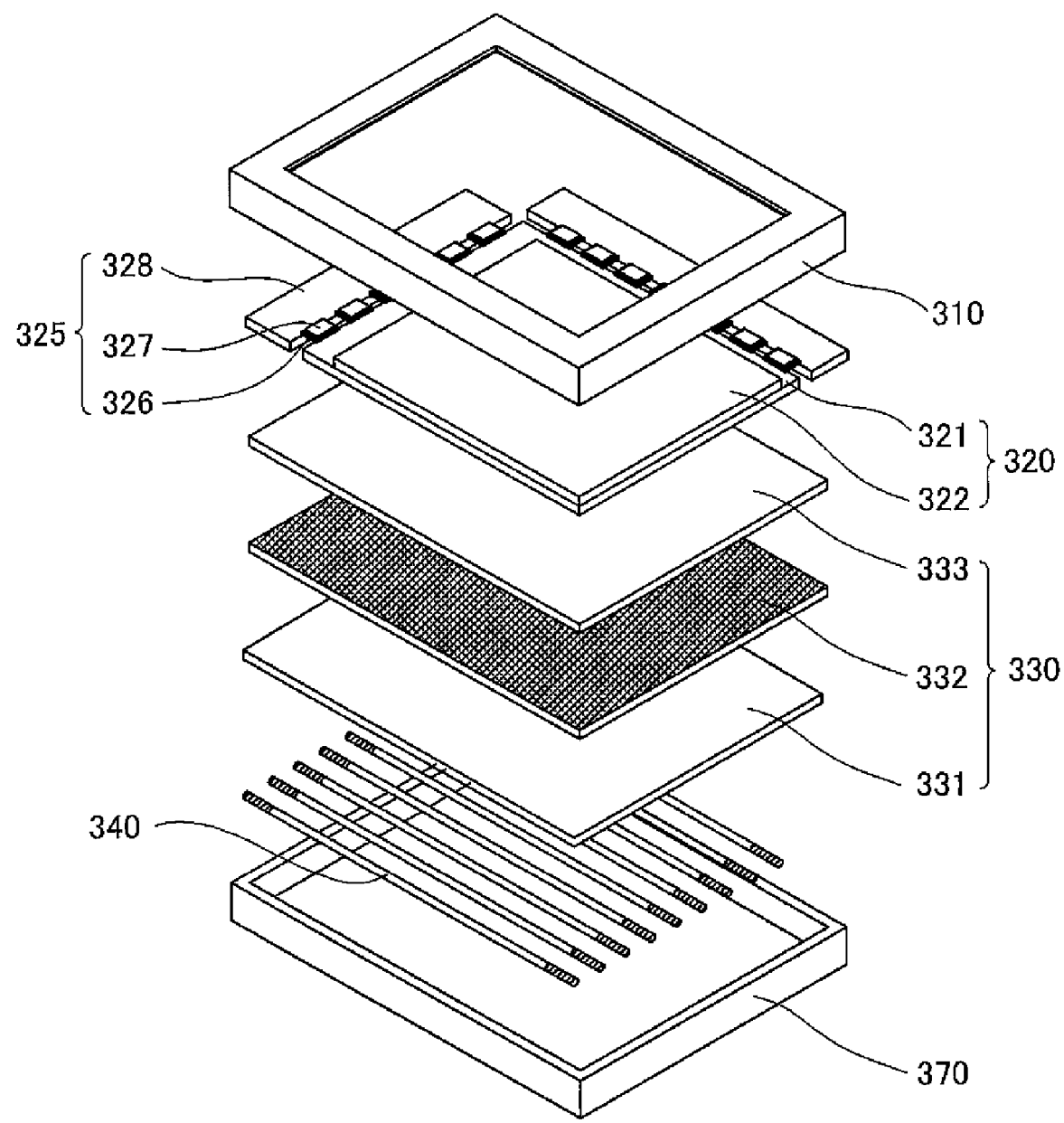
FIG. 18 is an exploded perspective view of a liquid crystal display according to an exemplary embodiment of the present invention.

As shown in FIG. 18, the LCD may comprise a light source 340 that outputs light. In addition, the LCD may comprise an optical sheet 332 comprising a base film, a projection disposed on one surface of the base film, and a first primer layer disposed between the base film and the projection. Also, the LCD may comprise a liquid crystal panel 320 that displays an image by using light outputted from the light source 340. In this case, the thickness of the first primer layer range substantially from about 5 nm to 300 nm.

Here, the optical sheet 332 may further comprise a second primer layer disposed on the other surface of the base film, and the refractive index of the second primer layer may be lower than that of the base film. Here, the thickness of the second primer layer may range substantially from about 5 nm to 300 nm. With the second primer layer included, a difference between the refractive rate of the base film and that of the second primer layer may range substantially from about 0.15 to 0.3.

Meanwhile, as the light source 340, one of a CCFL (Cold Cathode Fluorescent Lamp), an HCFL (Hot Cathode Fluorescent Lamp), an EEL (External Electrode Fluorescent Lamp), and an LED (Light Emitting Diode) may be selectively used but not limited thereto.

As the light source 340, one of an edge type lamp source in which lams are positioned at an outer edge of one side, a dual type lamp source in which lamps are positioned at both sides, and a direct type lamp source in which a plurality of lamps are arranged linearly may be selected, but not limited thereto. The light source 340 may be connected to an inverter to be provided with power and output light.

Figure 19:
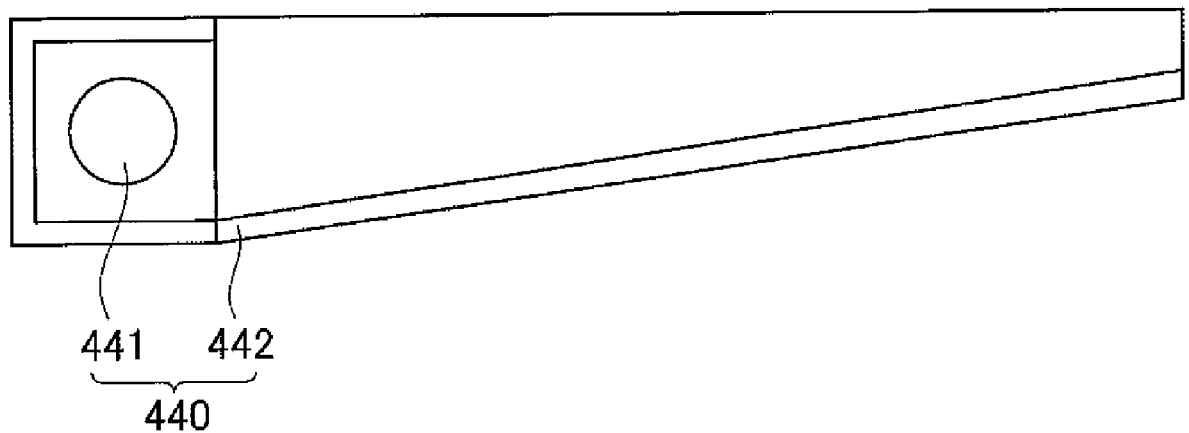
FIG. 19 is an exemplary view of an edge-type light source.

The light source as shown FIG. 18 is the direct type light source which is taken as an example. Meanwhile, FIG. 19 shows an edge-type light source 440. The edge type light source 440 as shown in FIG. 19 may comprise a lamp 441 formed at one outer side and a light guide plate 442 that guides light outputted (emitted) from the lamp 441.

Regarding the optical sheet 332, its projection may selectively have one of configurations of a prism, a diffusion part, a micro-lens, and a lenticular lens.

In more detail, if the projection has the prism configuration, it may have one of those configurations as shown in FIGS. 1 to 7 or FIGS. 11 to 16, but not limited thereto. In addition, if the projection is formed to have the diffusion part, it may have the configuration as shown in FIG. 8, but not limited thereto. If the protrusion is formed as a micro-lens, it may have the configuration as shown in FIG. 9, but not limited thereto. If the projection is formed as the lenticular lens, it may have the configuration as shown in FIG. 10, but not limited thereto.

The projection may comprise a plurality of beads as shown in FIG. 3, FIG. 12, FIG. 15 and FIG. 16, which can be one selected from the group consisting of the beads as shown in FIG. 17 (a) to (d), but not limited thereto.

In addition, if a second primer layer disposed on the other surface of the base film, it may have the configuration as shown in FIGS. 13 to 16, but not limited thereto.

The LCD may comprise an upper case 310 and a lower case 370 in which the liquid crystal panel 320 that displays an image and the light source 340 are received (accommodated).

The lower case 370 may receive (accommodate or house) the light source 340. The liquid crystal panel 320 may be disposed above the light source 340 with a certain interval therebetween. The liquid crystal panel 320 and the light source 340 may be fixed and protected by the lower case 370 and the upper case 310 fastened to the lower case 370.

An opening exposing an image display area of the liquid crystal panel may be formed on an upper surface of the upper case 310. A mold frame (not shown) may be further provided, on which peripheral portions of the plurality optical film layers 330 disposed between the liquid crystal panel 320 and the light source 340 are mounted.

The liquid crystal panel 320 may have such a structure that an upper plate 322 with color filters formed thereon and a lower plate 321 with thin film transistors (TFTs) formed thereon are attached with liquid crystal interposed therebetween. In the liquid crystal panel 320, sub-pixels are arranged in a matrix form and independently driven by the TFTs, and liquid crystal alignment is controlled by a difference voltage between a common voltage supplied to common electrodes and a data signal supplied to pixel electrodes via the TFTs in the respective sub-pixels, to control a light transmittance to thus display an image.

A driving unit 325 may be connected to the lower plate 321 of the liquid crystal panel 320. The driving unit 325 may comprise a plurality of film circuits 326 having one side connected with the lower plate 321 by mounting driving chips 327 for driving data lines and gate lines of the liquid crystal panel 320, respectively, and a printed circuit board (PCB) 328 connected with the other side of the plurality of film circuits 326.

The film circuits 326 with the driving chips 327 mounted thereon may be COF (Chip On Film) or a TCP (Tape Carrier Package) type film circuits. Alternatively, the driving chips 327 may be directly mounted as a COG (Chip On Glass) type on the lower plate 321, or may be formed on the lower plate 321 so as to be installed in a TFT formation process.

Here, the plurality of optical film layers 330 disposed between the liquid crystal panel 320 and the light source 340 may further comprise a diffusion plate (or diffuser) 331 and a protection sheet 333, in addition to the optical sheet 332 as described above.

The liquid crystal panel 320 may display an image at each pixel according to scan signals supplied through the gate lines and data voltages supplied through the data lines.

Here, the scan signal may be a pulse signal in which a gate high voltage supplied during only one horizontal time period and a gate low voltage supplied during the other remaining periods alternate.

When the gate high voltages are supplied from the gate lines, the TFTs included in the pixels are turned on to supply data voltages applied from the data lines to liquid crystal cells.

The liquid crystal cells may be formed between the pixel electrodes to which data voltages are supplied from the data lines and the common electrodes to which a common voltage is applied.

Accordingly, in the LCD, when the data voltages are applied to the pixel electrodes as the TFTs of the respective pixels are turned on, difference voltages between the data voltages and the common voltage are charged in the liquid crystal cells to thus display an image.

Conversely, if the gate low voltages are supplied from the gate lines, the TFTs are turned off and the data voltages charged in the liquid crystal cells may be maintained during one frame by a storage capacitor.

In this manner, the liquid crystal panel 320 may repeatedly perform different operations according to the scan signals supplied through the gate lines.

As described above, the optical sheet according to the present invention can effectively utilize light outputted from the backlight unit, so the LCD having such optical sheet may have the advantages that its power consumption according to the use of a battery and a light source can be reduced, its luminance can be increased, and it has a wide viewing angle. Consequently, the optical sheet capable of improving the optical characteristics and its manufacturing method according to the present invention can lead to an improvement of the display quality of the LCD.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An optical sheet comprising:
a base film;
a first primer layer disposed on a surface of the base film;
a second primer layer disposed on the other surface of the base film; and
a projection disposed on the first primer layer,
wherein a thickness of the first primer layer ranges from about 5 nm to 300 nm,
wherein a refraction index of the base film is different than a refraction index of the second primer layer, and
wherein the projection comprises a bead with smaller beads therein.

2. The optical sheet of claim 1,
wherein a refraction index of the base film is larger than that of the second primer layer.

3. The optical sheet of claim 1, wherein a difference in refraction index between the base film and the second primer layer ranges from about 0.15 to 0.3.

4. The optical sheet of claim 1, wherein a refraction index of the base film ranges from about 1.55 to 1.70, and a refraction index of the second primer layer ranges from about 1.40 to 1.60.

5. The optical sheet of claim 1, wherein a thickness of the second primer layer ranges from about 5 nm to 300 nm.

6. The optical sheet of claim 1, wherein a refractive index of the base film is different from that of the first primer layer.

7. The optical sheet of claim 1, wherein the projection is a prism.

8. The optical sheet of claim 1, wherein the projection is a diffuser.

9. The optical sheet of claim 1, wherein the projection is a micro lens.

10. The optical sheet of claim 1, wherein the projection is a lenticular lens.

11. The optical sheet of claim 1, wherein the projection includes a plurality of beads.

12. The optical sheet of claim 1, further comprising a base part between the first primer layer and the projection.

13. The optical sheet of claim 12, wherein a thickness of the base part ranges from 5%~50% of a height of a peak of the projection.

14. The optical sheet of claim 1, wherein a refraction index of the first primer layer and the refraction index of the second primer layer are different.

15. A liquid crystal display device comprising:
a liquid crystal panel;
a light source; and
an optical sheet including:
    a base film;
    a first primer layer disposed on a surface of the base film;
    a second primer layer disposed on the other surface of the base film; and
    a projection including a base part disposed on the first primer layer,
    wherein a thickness of the first primer layer ranges from about 5 nm to 300 nm,
    wherein a refraction index of the base film is different than a refraction index of the second primer layer, and
    wherein the projection comprises a bead with smaller beads therein.

16. The liquid crystal display device of claim 15, wherein a difference in refractive index between the base film and the second primer layer ranges from about 0.15 to 0.3.

17. The liquid crystal display device of claim 15, wherein the projection is at least one of a prism, diffuser, micro lens and lenticular lens.

18. The liquid crystal display device of claim 15, wherein a refraction index of the first primer layer and the refraction index of the second primer layer are different.

19. The liquid crystal display device of claim 15, wherein a thickness of the second primer layer ranges from about 5 nm to 300 nm.

20. The liquid crystal display device of claim 15, wherein a thickness of the base part ranges from about 5%~50% of height of a peak of the projection.

* * * * *